United States Patent [19]
Thomas et al.

[11] Patent Number: 5,465,828
[45] Date of Patent: Nov. 14, 1995

[54] AUTOMATED MAIL PROCESSING CLEANING SYSTEM

[75] Inventors: Donald Thomas, Woodside; Steve Ellis, Sacramento; Paul Kriz, South San Francisco; Gordon Scott, Los Altos, all of Calif.

[73] Assignee: Thomas Air Systems, Inc., South San Francisco, Calif.

[21] Appl. No.: 277,930

[22] Filed: Jul. 20, 1994

[51] Int. Cl.⁶ ............................................. B65G 45/00
[52] U.S. Cl. .................................................. 198/495
[58] Field of Search ............................. 198/495, 493, 198/438, 372, 370.11; 209/900

[56] References Cited

U.S. PATENT DOCUMENTS

| | | | |
|---|---|---|---|
| 2,991,893 | 7/1961 | Kirsch et al. | 198/438 |
| 3,469,088 | 9/1969 | Coleman et al. | 240/7.1 |
| 4,187,868 | 2/1980 | Rudolphi | 134/184 |
| 4,221,329 | 9/1980 | Schneider | 235/458 |
| 4,369,873 | 1/1983 | Heuft | 198/372 |
| 4,441,018 | 4/1984 | Wessel | 235/458 |
| 4,452,255 | 6/1984 | Brand | 198/438 |
| 4,603,898 | 8/1986 | Udagawa et al. | 296/91 |
| 4,678,224 | 7/1987 | F'Geppert | 296/91 |
| 5,097,563 | 3/1992 | Cowan | 15/313 |
| 5,245,601 | 9/1993 | Hake | 369/72 |
| 5,348,136 | 9/1994 | Kenny et al. | 198/493 |

FOREIGN PATENT DOCUMENTS

| 204511 | 10/1985 | Japan | 198/495 |
|---|---|---|---|
| 701889 | 12/1979 | U.S.S.R. | 198/495 |

*Primary Examiner*—Joseph E. Valenza
*Attorney, Agent, or Firm*—Townsend and Townsend and Crew

[57] ABSTRACT

A method and apparatus for cleaning dust and particulate from automated mail processing equipment having a conveyer disposed along a plurality of processing stations is provided. The cleaning system includes at least one air nozzle disposed at each station and at least one vacuum port disposed at each station and spaced apart from the air nozzle. A vacuum for creating a vacuum at the vacuum port and an air source for directing air through the air nozzle is provided. A sequencer for allowing air to sequentially pass through the air nozzle at each station while a vacuum is created at the same station is provided. A controller in communication with the sequencer is provided for relaying sequencing information to the sequencer.

15 Claims, 8 Drawing Sheets

AUTOMATED MAIL PROCESSING CLEANING SYSTEM

BACKGROUND OF THE INVENTION

1. Field of the Invention

The present invention relates to a method and apparatus for cleaning mail processing equipment, and in particular to a cleaning system for removing accumulated dust and particulate from the mail processing equipment.

Modern mail processing equipment is designed to rapidly receive and sort large quantities of mail. To accomplish this task, various types of mail processing equipment have been employed. Of particular interest to the present invention are optical character readers (OCR) such as OCR Model MLOCR-B, available from Electro Com Automation LP, Arlington, Tex. The OCR includes a conveyor system which rapidly transports the mail past an optical character reader which in turn reads information written on the envelope. This information is then processed by a computer and used to sort the mail.

Also of interest are wide area bar code readers (BCS) such as Model BCS 880, available from Electro Com Automation LP, Arlington, Tex. BCSs are used to read the bar code printed by an OCR on an envelope and to sort to a deeper level, i.e. station and carrier route.

Another type of mail processing machine is an advanced canceler system (AFCS), such as Model AFCS FAM 885, available from Electro Com Automation LP, Arlington, Tex. AFCSs are used to cancel mail arriving at the post office. They sort the mail into the following categories: (1) OCR readable, (2) non-readable, (3) bar code printed on envelope, (4) business reply, and (5) non-cancelable mail.

Still another type of mail processing machine of interest is a delivery bar code sorter (DBCS), such as Model DBCS II 994, available from Electro Com Automation LP, Arlington, Tex. DBCSs are similar to the BCS but have even deeper level of sorting (to carrier walking sequence) and have more sort bins.

Common to such mail processing equipment are conveyor systems used for transporting the mail along at least a portion of the equipment. Usually the conveyor system will include a pair of spaced-apart belts disposed along a series of pulleys so that mail can individually be transported between the belts. As mail travels along the conveyor system, particulate is generated within the equipment which can prevent the equipment from remaining in good working order. This problem is compounded since a large volume of mail is transported by the conveyor system causing rapid accumulation of the particulate.

Present methods for removing the accumulated dust and particulate require the machines to be shut down for a considerable length of time so that the accumulated particulate can be accessed for removal. The particulate is removed by a blow out procedure which is usually required every two hours on a run of sixteen to eighteen hours per day. The blow out is required for each BCS, OCR, AFCS, and DBCS. However, this blow out is rarely performed because of the extensive down time. Such an extensive down time is undesirable for a variety of reasons including labor costs incurred in breaking down and cleaning the equipment and slowing distribution of mail.

It would therefore be desirable to provide a cleaning system for mail processing equipment that could reduce or eliminate the down time required to remove accumulated particulate from the equipment. The system should also be efficient and economical, and be compatible with existing mail processing equipment.

2. Description of the Background Art

U.S. Pat. No. 4,221,329 describes the use of an airstream to create a "fluid curtain" in order to prevent accumulation of particulate on a photo detector.

U.S. Pat. No. 5,245,601 describes the use of ribs on a turntable to generate air flow to blow dust away from optical equipment.

U.S. Pat. No. 4,441,018 describes an apparatus using temperature differences in air to create air flow to remove particulate from photoelectric components of the apparatus.

U.S. Pat. Nos. 5,097,563, 4,603,898, and 4,678,224 describes systems for blowing air over windshields to prevent particulate accumulation on the windshields.

U.S. Pat. No. 3,469,088 describes the use of a pressurized cleaning fluid for cleaning the lens of a vehicle running light without interrupting the operation of the vehicle.

U.S. Pat. No. 4,187,868 describes the method for cleaning the surface of an optical element by applying a liquid to the surface and causing the liquid to vibrate.

SUMMARY OF THE INVENTION

A cleaning system for mail processing equipment having a conveyor for transporting mail is provided. The cleaning system includes an air supply means for directing a supply of air near the conveyor. Vacuum means spaced-apart from the air supply means are provided for creating a vacuum near the air supply means. A controller is provided for actuating the vacuum means during the operation of the air supply means.

In one particular aspect of the cleaning system, the air supply means includes a plurality of spaced-apart air nozzles near the conveyor for directing a plurality of air streams, and the vacuum means includes a vacuum and a plurality of spaced-apart vacuum ports near the conveyor. In a further aspect, the mail processing equipment includes a plurality of processing stations. At least one air nozzle and at least one vacuum port are disposed at each station with the nozzles being spaced-apart from the vacuum ports.

In another particular aspect, a sequencer in communication with the controller is provided for sequentially actuating the air nozzles and the vacuum ports of each air station. In an exemplary aspect, a plurality of air lines are disposed between the sequencer and the nozzles of each station with a separate air line being provided for each station. A plurality of vacuum lines are also disposed between the vacuum and the vacuum ports of each station with a separate vacuum line being provided for each station.

In yet another aspect, the sequencer is a pneumatic sequencer and includes a plurality of control valves. The control valves allow air to be sequentially delivered to each of the air lines. An air gate is disposed in each of the vacuum lines with each of the air gates being in communication with one of the lines. Preferably, each air gate is in communication with the air line that is disposed at the same station at which the vacuum line having the air gate is also disposed. This configuration allows the air gate in the vacuum line to be actuated when air is delivered through the air line. This provides air to one of the stations while at the same time creating a vacuum at the same station.

In still another aspect, the vacuum ports are disposed in a plenum. Preferably, each station will have a separate plenum.

In an exemplary aspect, the cleaning system is used to clean more than one piece of mail processing equipment. This is accomplished by providing a plurality of sequencers which are all in communication with the controller. Each piece of equipment will include a separate sequencer with each sequencer having a plurality of air lines disposed along their respective pieces of equipment as previously described. With this configuration the controller can provide a signal to sequentially actuate each sequencer. This allows each piece of equipment to sequentially be cleaned as dictated by the controller.

In a exemplary embodiment, a cleaning system for a mail optical character reader having a conveyer disposed along a plurality of processing stations is provided. The cleaning system includes at least one air nozzle at each station and at least one vacuum port disposed at each station with the vacuum port being spaced apart from the air nozzle. A vacuum is provided for creating a vacuum at the vacuum port, and an air source is provided for directing air through the air nozzle. A sequencer is provided for allowing air to sequentially pass through the air nozzle at each station while a vacuum is created in the vacuum the same station. A controller in communication with the sequencer provides sequencing information to the sequencer.

In an exemplary method of the invention, dust and particulate are cleaned from mail processing equipment having a conveyer for transporting mail by blowing a stream of air over an area of the equipment near the conveyor having the particulate. A vacuum is created near the air stream to collect particulate near the air stream. The blowing and vacuuming steps are repeated along the conveyer.

In one aspect of the method, the air stream is blown over the area by providing a plurality of nozzles connected to an air source. The vacuum is created by providing a plurality of vacuum ports connected to a vacuum source. The vacuum ports are disposed near the conveyor and spaced apart from the air lines. In another aspect of the method, the mail processing equipment includes a plurality of processing stations and at least one nozzle and at least one vacuum port are disposed at each station. The blowing and vacuuming steps are repeated by sequentially actuating the nozzle and the vacuum port at each station.

In yet another aspect of the method, the mail processing equipment includes a plurality of processing stations and the stream of air is blown at the same station at which the vacuum is created. In another aspect, the blowing and vacuuming steps are repeated by blowing and vacuuming sequentially along the stations. In a further aspect, the stream of air is blown while simultaneously creating the vacuum.

The invention allows the mail processing equipment to be cleaned daily and without extensive labor costs. Routine cleaning allows the equipment to function more efficiently. Furthermore, since daily blow out is not required, custodial costs can be reduced as dust is not blown to surrounding areas and equipment.

DETAILED DESCRIPTION OF THE SPECIFIC EMBODIMENT

The invention provides a cleaning system for removing accumulated dust and particulate from mail processing equipment. According to the cleaning system, a vacuum is provided near areas of the equipment where dust and particulate tend to accumulate. Operation of the vacuum creates a suction force for removing the particulate from the processing equipment. To further assist in removing the dust and particulate, air is blown through the equipment near the vacuum. The blowing air displaces some of the dust and particulate toward the vacuum where it can be collected.

The cleaning system is particularly adaptable to mail processing equipment having a variety of different processing stations through which mail is directed, usually by a conveyer system as previously described. For a variety of reasons, including limited vacuum size, it is often desirable to clean only one station at a time. Of course, if a sufficient vacuum were provided, all of the stations could be cleaned simultaneously.

When cleaning only one station at a time, a sequencer is provided to sequentially actuate an air flow and a corresponding vacuum for each station. By "sequentially" it is intended to mean that only one station will be cleaned at a time. When cleaning is completed at one station, the cleaning process will then begin at another station.

The vacuum will preferably be operational at the same time at which air is being directed through the equipment, i.e., the vacuum and the air stream are simultaneously operated. Alternatively, the vacuum and the air stream can be operated separately or at different times, but preferably the vacuum will always be operated when air is being directed through the equipment.

A controller is provided to deliver sequencing information to the sequencer. Through the controller, the order at which the stations can be cleaned as well as the length of the cleaning cycles can be dictated. This provides an automated and continuous cleaning cycle.

In one exemplary aspect of the invention, the cleaning system can be used to clean a variety of different pieces of mail processing equipment including BCSs, OCRs, AFCS, and DBCSs. The cleaning system can be used to effectively clean these pieces of equipment alone or in various combinations. As one example, the system could be used to cyclically clean three OCRs and two BCSs.

Cleaning a plurality of pieces of cleaning equipment is best accomplished by providing a separate sequencer for each piece of equipment and with each sequencer being in communication with the controller. With this configuration, only one vacuum source and one air source is required if the vacuum and air sources are in communication with each piece of equipment. The controller can send a signal to the sequencer for the first piece of equipment to be cleaned. Each cleaning station of this piece of equipment can then be cleaned in sequence. Once the cycle for the first machine is completed, the controller will send a signal to the next sequencer and the next piece of mail processing equipment will be cleaned in the same manner.

Figure 1:
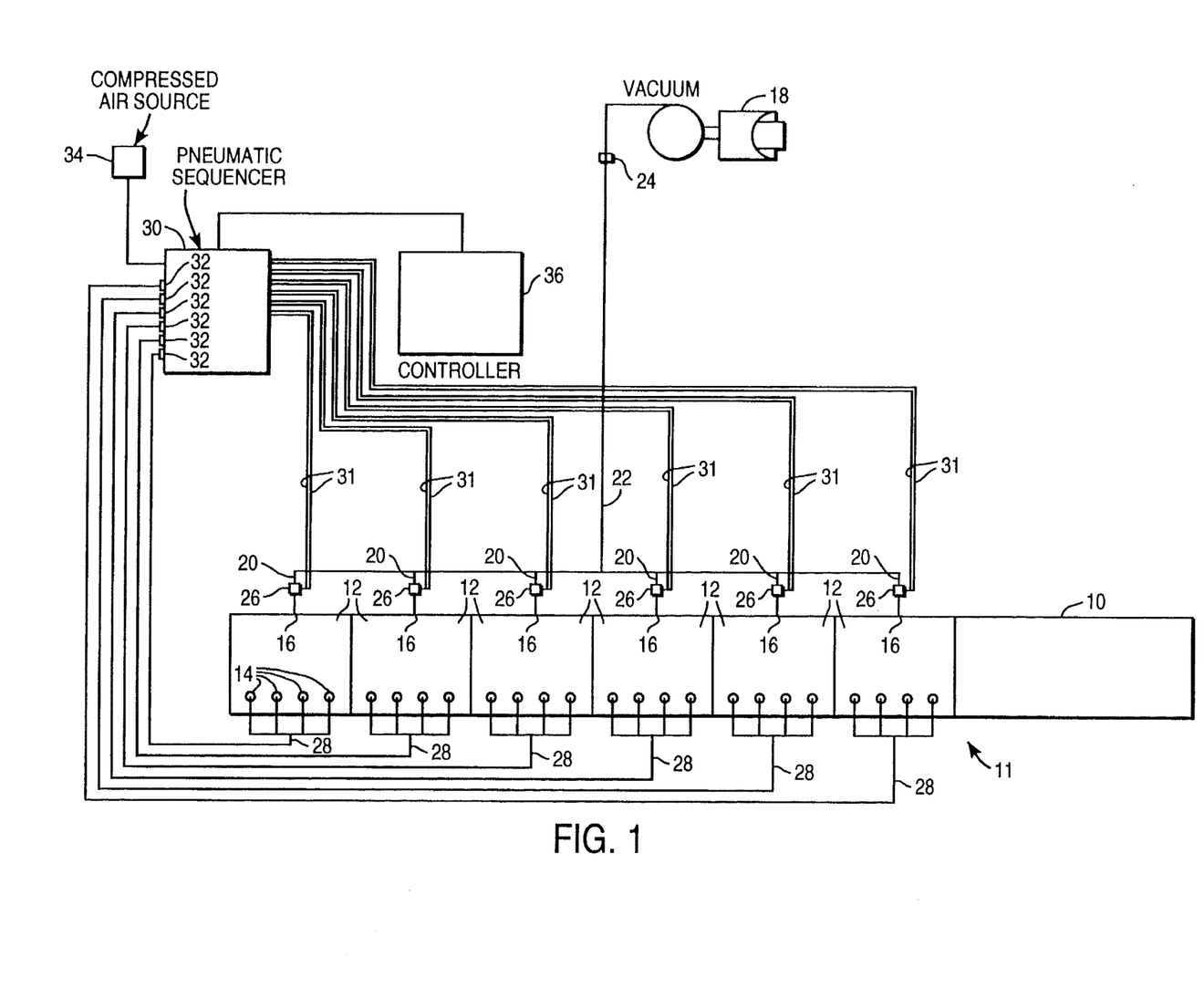
FIG. 1 is a schematic view of a cleaning system for an OCR according to the present invention.

Shown in FIG. 1 is a schematic view of an optical code reader (OCR) 10 having a cleaning system 11. Although described in the context of an OCR, the system described hereinafter could also be used with other types of mail processing equipment including a DBCS, an AFCS, a BCS, and the like, as previously described. For purposes of clarity, however, the cleaning system 11 will be described only in connection with an OCR.

The OCR 10 includes a plurality of processing stations 12. Not shown is a conveyer system disposed along the OCR 10 which transports mail between the stations 12. Disposed at each station 12 are a plurality of air nozzles 14 for directing air through the OCR 10. As described in more detail hereinafter, the nozzles 14 are preferably disposed near areas in the OCR 10 where a significant amount of particulate is typically generated.

Spaced apart from the air nozzles 14 are a plurality of vacuum ports 16. The vacuum ports 16 are disposed so that each processing station 12 includes at least one port 16. A vacuum 18 is connected to the ports 16 by a plurality of vacuum lines 20. Preferably, each station 12 will have a single vacuum line 20. The vacuum lines 20 are connected to the vacuum 18 by a common line 22. Disposed in the common line 22 is a main vacuum gate 24. When the main vacuum gate 24 is opened and the vacuum 18 activated, a vacuum is supplied to each of the vacuum lines 20. To control the number of stations 12 receiving the vacuum, each vacuum line 20 is provided with a vacuum line gate 26. The vacuum line gates 26 can be opened and closed as desired depending upon the number of stations 12 which are to receive the vacuum.

Air is provided to the air nozzles 14 by a plurality of air lines 28. Preferably, each station 12 will have a separate air line 28. The air lines 28 are connected to a pneumatic sequencer 30 having a plurality of air gates 32. The air gates 32 can be opened and closed as desired depending on which stations 12 are desired to receive the air. Compressed air is delivered to the air lines 28 by an air source 34.

In an exemplary embodiment, the vacuum line gates 26 are connected to the pneumatic sequencer 30 by a plurality of air lines 31 that are separate from air lines 28. Preferably, each gate 26 has two air lines, with one of the line 31 being used to open the gate 26, and the other being used to close the gate 26. The sequencer 30 includes a plurality of vacuum gate valves (not shown) to control air delivery through these air lines so that the vacuum in the processing stations 12 can be created independently from the delivery of air through nozzles 14. Preferably, the controller 36 will signal the sequencer 30 to direct air through at least one of the air lines 28 at the same time air is directed through at least one of the air lines 31 disposed to open one of the air gates 26. This allow air to be directed through the stations 12 at the same time that the vacuum is created. Preferably, air will be directed through the air line 28 having the same station 12 in common with the opened air gate 26 so that the air and vacuum will be created simultaneously at the same station 12.

In an alternative embodiment, air lines 31 are removed and each air line 28 is placed in communication with the vacuum line gate 26 having the same station 12 in common. When air is provided to one of the air lines 28, air will be directed through the nozzles 14 of the associated station 12 and also into the vacuum line gate 26 of the same station 12. This simultaneously opens the vacuum line gate 26 and creates a vacuum at the vacuum port 16 for the same station 12 receiving the air from the nozzles 14, i.e., a vacuum and an air flow are simultaneously created at the same station. Hence, once the vacuum 18 is activated and the main vacuum gate 24 is opened, air directed through any one of the air lines 28 will cause air to flow through a particular station 12 and will simultaneously create a vacuum at the same station.

To determine the order of station cleaning, a controller 36 in communication with the pneumatic sequencer 30 is provided. The controller 36 sends signals to the pneumatic sequencer 30 to instruct the sequencer 30 as to the order to which the air valves 32 should be opened. When more than one piece of mail processing equipment is included in the cleaning system, the controller 36 sends signals to the sequencers 30 of each piece of equipment to dictate the order of equipment cleaning.

Exemplary controllers 36 include an IDEC FA 2J or FA3S PLC, commercially available from supplies such as Steven Engineering, South San Francisco, Calif. Such controllers can be provided with a 4 kilobyte electrically erasable programmable read only memory (EEPROM) so that the controllers programming is not lost during power outages or brown-outs. The controller 36 is connected to the pneumatic sequencer 30 by a variety of input and output devices. These input and output devices are also used to connect the controller to the vacuum 18 and to the OCR 10. This allows the controller 36 to actuate the vacuum 18 and to receive signals from the OCR 10 regarding its state of operation. After receiving such signals from the OCR 10, the controller 36 can determine whether it is proper to proceed with the cleaning cycle. If the signals indicate that it is proper to proceed, the controller 36 signals the pneumatic sequencer 30 to begin the cleaning cycle.

An exemplary pneumatic sequencer 30 is a Pneumatic Control and air source, commercially available from RTU Electronics, Sacramento, Calif. The pneumatic sequencer 30 can be provided with two control sides, a vacuum gate control side and a compressed air control side. On the compressed air control side are the air gates 32. Preferably, gates 32 are solenoid valves and are connected to polyethylene tubing which forms the air lines 28. Signals received from the controller 36 are used to open the air control solenoid valves 32 which deliver compressed air through the air lines 28. When the air lines 28 are connected to both the nozzles 14 and the vacuum line gates 26 both compressed air and a vacuum can be created simultaneously at the same station 12.

As previously described, a plurality of vacuum control solenoid valves (not shown) can alternatively be provided on the vacuum gate control side of the sequencer 30 (not shown). The vacuum control solenoid valves can be directly connected to the vacuum line gates 26 by tubing so that a vacuum can be provided at each station 12 independently of the compressed air delivery through the lines 28. To control the opening of the vacuum line gates 26, the controller 36 can be configured to send a signal to the pneumatic sequencer 30 to open the vacuum control solenoid valves which in turn deliver air to the vacuum line gates 26 to provide the vacuum. The controller 36 can be configured so that the air control solenoid valve and the vacuum control solenoid valve having the same station in common are simultaneously opened to simultaneously provide compressed air and a vacuum at the common station.

An exemplary vacuum is a 15 H.P. Industravac, commercially available from Thomas Air Systems, Inc., South San Francisco, Calif. Such a vacuum is able to create sufficient suction at each of the stations 12 to remove the particulate. During a cleaning cycle, the vacuum 18 will preferably be in continuous operation with the gates 26 being used to channel or direct the vacuum to the desired station 12.

Although not shown, the controller 36 can be in communication with a plurality of OCRs 10 (or similar types of mail processing equipment), with each OCR 10 being provided with a pneumatic sequencer 30 and corresponding air and vacuum lines. As previously described, the same vacuum 18 can be used to produce the vacuum for each of the OCRs 10. This is best accomplished by providing a plurality of common lines 22 (and associated main vacuum gates 24) which are each connected to the vacuum lines 20 of each OCR 10. The main vacuum gates 24 when placed in communication with the controller 36 can then be used to control which OCRs 10 are to receive the vacuum.

Before a cleaning cycle is begun on a particular OCR 10, the controller 36 receives various signals from the OCR 10 to determine if the OCR 10 is ready for cleaning. In one particular aspect, a "stop line" signal is received from the OCR 10 indicating whether the OCR's cover or panel is open so that compressed air will not be activated while the cover or panel is open. Another signal is a "process" signal which indicates whether the OCR 10 is out of service. If the OCR 10 is not operational, then cleaning is not necessary and the controller 36 will not begin the cycle for that OCR 10. Another signal is a "no mail" signal. As described in more detail hereinafter, this signal allows for compressed air to be delivered to the feed section of the OCR 10 between cycles.

Figure 2:
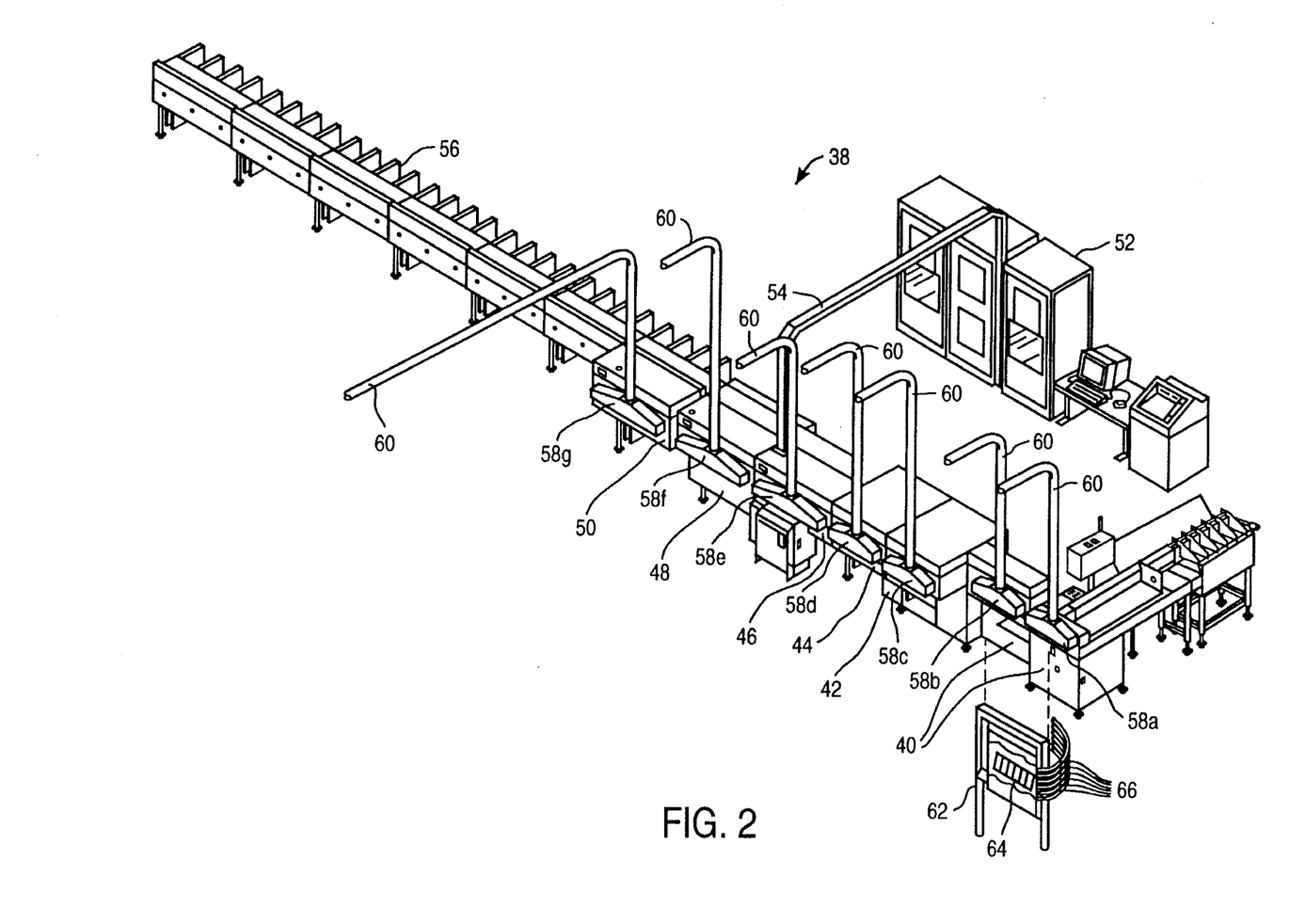
FIG. 2 is a perspective view of an OCR having a cleaning system according to the present invention.

Referring to FIG. 2, a perspective view of an OCR 38 is shown. The OCR 38 includes a variety of processing stations including a feeder/leveler station 40, a SCAN-1 station 42, a SCAN-2 station 44, a DELAY-1 station 46, a DELAY-2 station 48, and a DELAY-3 station 50. Mail is introduced to the OCR 38 at the feeder/leveler station 40 where it passes through the SCAN and DELAY sections 42–50. Information read from the mail is delivered to a computer system 52 through a conduit 54 and is used to sort the mail into various sorting stations 56. Attached to the stations 40–50 are plenums 58a–58g, respectively, for creating a vacuum at the stations. Attached to each plenum is a vacuum line 60 which is connected to a vacuum (not shown). Attached to the OCR 38 by a frame 62 is a pneumatic sequencer 64. Connected to the pneumatic sequencer 64 are a plurality of air lines 66. Although shown discontinued in FIG. 2, the air lines 66 continue to each station 40–50 where they are used to provide compressed air to the stations as previously described in connection with FIG. 1. Connected to the vacuum, the sequencer 64 and the OCR 38 is a controller (not shown) which is used to actuate and control the cleaning cycle as previously described.

Figure 3:
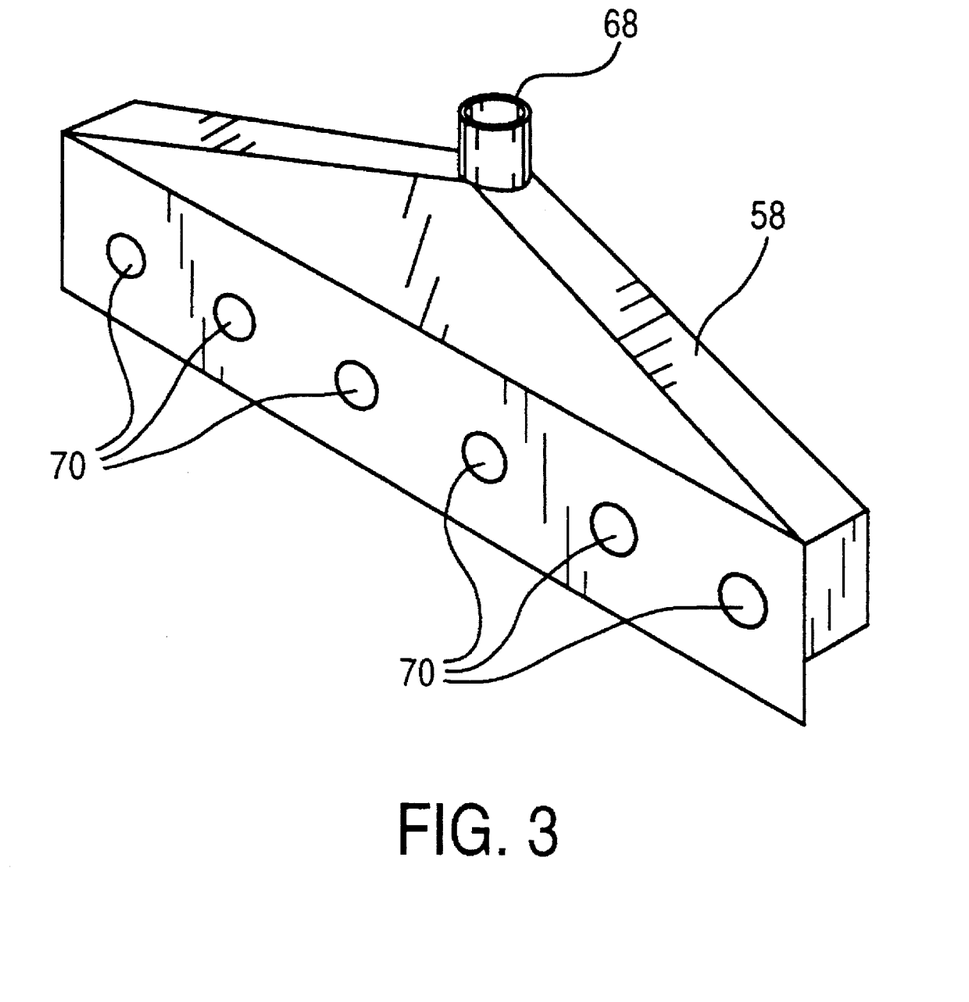
FIG. 3 is a perspective view of a plenum according to the present invention.

Referring to FIG. 3, a plenum 58 will be described in greater detail. The plenum 58 includes a vacuum line connection 68 and a plurality of vacuum ports 70. The plenum 58 serves essentially as a manifold to distribute suction at the vacuum line connection 68 to the vacuum ports 70.

Figure 4:
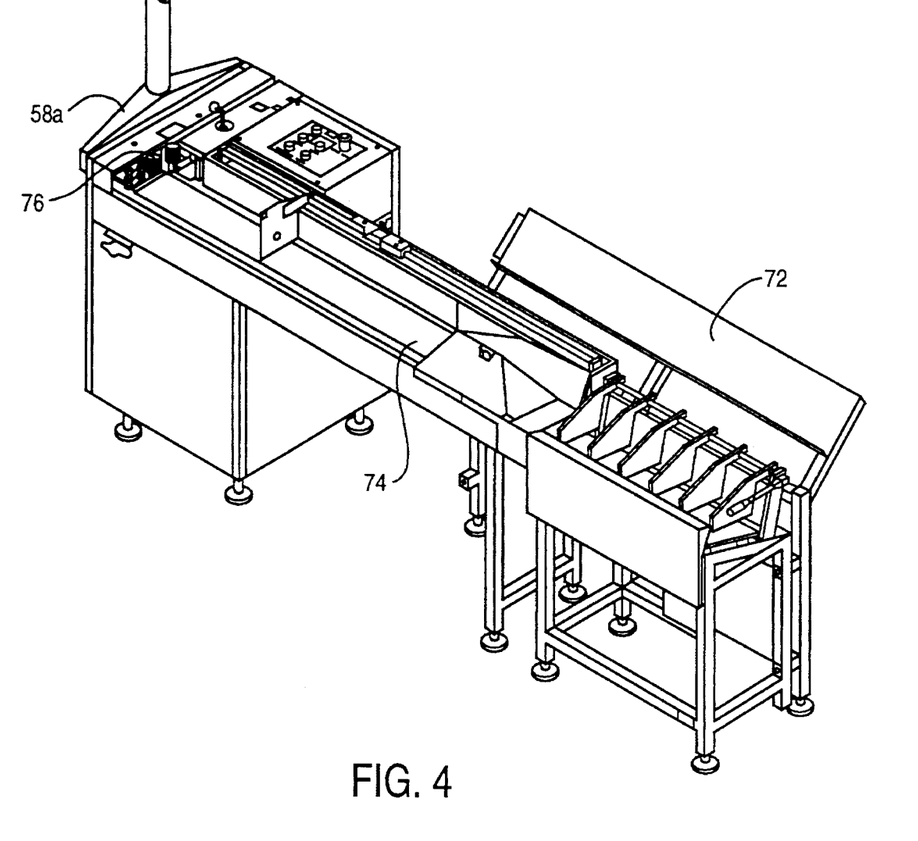
FIG. 4 illustrates a feeder station of the OCR of FIG. 2.

Referring to FIGS. 4–8, the stations 40–50 will be described in greater detail to show an exemplary placement of various air direction devices within the stations 40–50. The particular placement of these devices within the stations 40–50 is only one type of placement scheme that has been found to be particularly effective. However, other placement schemes can also be provided and are considered to be within the scope of this invention. Shown in FIG. 4 is a feeder section 72 of the feeder/leveler station 40 of FIG. 2. Mail is initially placed on a horizontal belt 74 where is it fed into a friction separator assembly 76. Attached to the separator assembly 76 is the plenum 58a which is used to create the vacuum in the separator assembly 76. The separator assembly 76 is shown in greater detail in FIG. 5. The separator assembly 76 preferably includes an air nozzle 78 and a air knife 80 for delivering air to the assembly 76 in the direction indicated by the arrows. Preferably, the air nozzle 78 will be a 90° nozzle ¼" NPT, and the air knife 80 will be an ionic air knife having a length of about 6 inches. The air nozzle 78 and air knife 80 are connected to the pneumatic sequencer 64 of FIG. 2 by the air lines 66 (shown in FIG. 2). When air is directed through the nozzle 78 and the air knife 80, the compressed air displaces particulate in the assembly 76 which is collected by the vacuum ports 70 of the plenum 58a.

Figure 6:
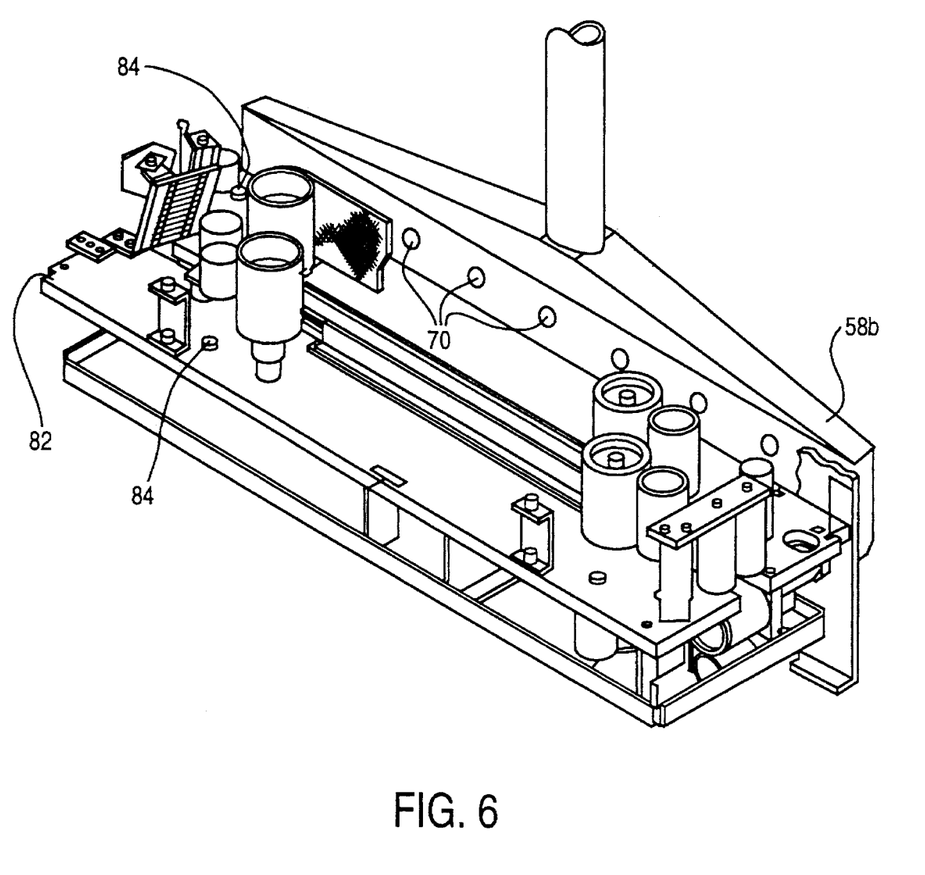
FIG. 6 is a detailed view of an interior portion of a leveler station of the OCR of FIG. 2 showing a preferred placement of air nozzles according to the present invention.

Referring to FIG. 6, an interior portion of a leveler section 82 of the feeder/leveler 40 of FIG. 2 is shown. The leveler section 82 preferably includes two air nozzles 84 (one nozzle 84 shown elevated for purposes of clarity). The air nozzles 84 direct air as indicated by the arrows. Preferably, the air nozzles 84 will be whirl jet 90° nozzles ⅜" NPT. The nozzles 84 are connected to the air lines 66 of FIG. 2 as previously described. When air is directed through the nozzles 84, particulate is displaced so that it can be removed through the vacuum ports 70 of the plenum 58b. Alternatively, other types and sizes of nozzles can also be used and can also be placed in other locations on the leveler section 82.

Figure 7:
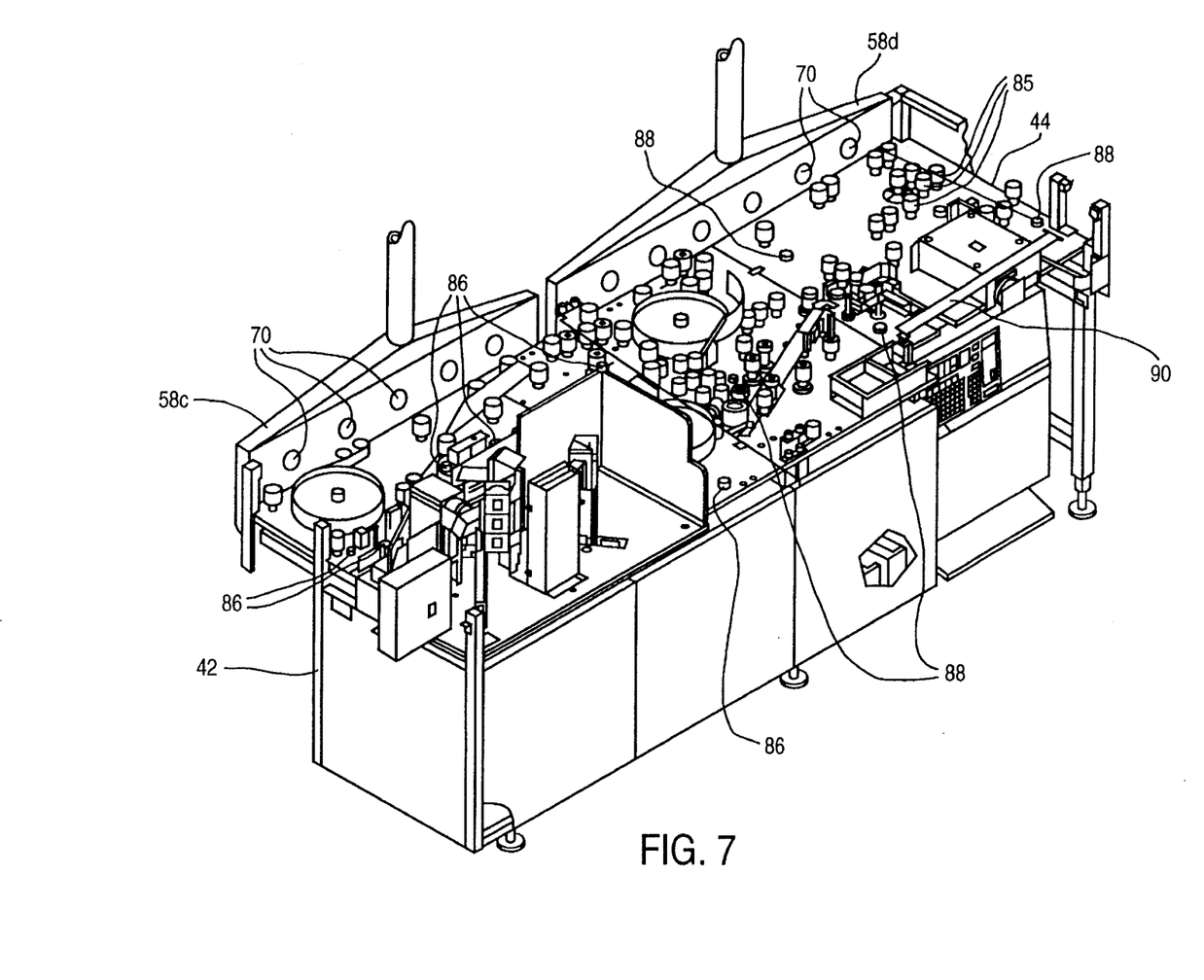
FIG. 7 illustrates a detailed view of a SCAN-1 and a SCAN-2 station of the OCR of FIG. 2 and showing a preferred placement of air nozzles.

Shown in FIG. 7 is the SCAN-1 42 and the SCAN-2 44 stations of the OCR 38 of FIG. 2. For purposes of clarity, the conveyor belts have been removed and only the pulleys 85 are shown. The SCAN-1 station 42 includes a plurality of air nozzles 86. These nozzles will preferably be selected from the group consisting of flat jet nozzles, fan jet nozzles, adjustable fan jet nozzles, and the like. The nozzles 86 are disposed so that when air is directed through the nozzles, particulate is displaced where it can be evacuated from the SCAN-1 station 42 by the vacuum port 70 of the plenum 58c. Disposed in the SCAN-2 station 44 are a plurality of air nozzles 88 and an air knife 90. The air nozzles 88 will be preferably selected from the group consisting from flat jet nozzles, shower head nozzles and 90° nozzles. Preferably, the air knife 90 will be a 24" ion air knife and will direct air towards the plenum 58d as indicated by the arrows. As with the other stations, other types of nozzles and other types of configurations can be used.

Figure 8:
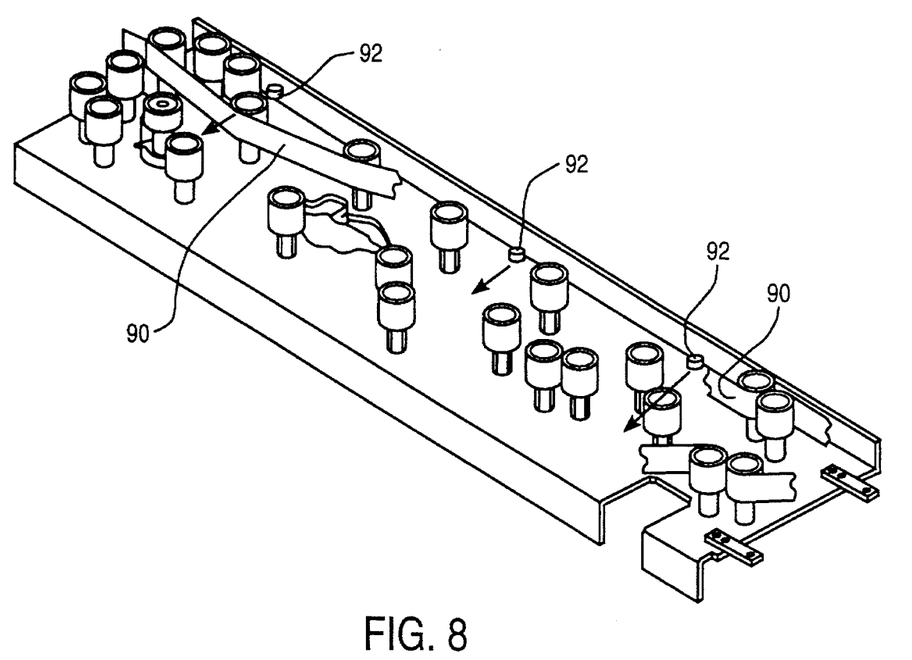
FIG. 8 illustrates a detailed view of a portion of the DELAY-1 DELAY-2, AND DELAY-3 stations of the OCR of FIG. 2 and showing preferred nozzle configurations according to the present invention.

Referring now to FIG. 8, an interior portion of DELAY-1 station 46 is shown (with a portion of belts 91 removed for clarity). This interior portion is essentially identical to the interior portions of the DELAY-2 and DELAY-3 stations 48, 50 and preferably includes essentially the same nozzle configurations. Hence, for purposes of clarity, only the interior portion of DELAY-1 station 46 will be described. Not shown in FIG. 8 is the plenum 58e which is located opposite three air nozzles 92. The air nozzles 92 are preferably 90° whirl jet nozzles ⅜" NPT and direct air toward the plenum as indicated by the arrows. As with the other stations, the number, type, and configuration of the nozzles can be varied as desired.

Figure 5:
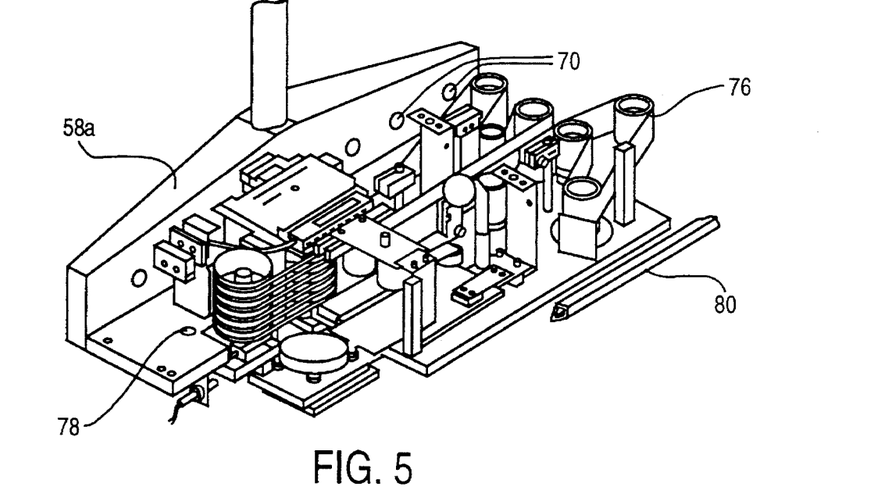
FIG. 5 is a detailed view of an interior portion of the feeder of FIG. 4 showing a preferred placement of air nozzles according to the present invention.

The ionic air knives shown in FIGS. 5 and 7 remove the static charge of the dust particulate for easier removal from the base plate of the equipment. As the belts in the equipment turn around the pulleys, a charge of static electricity is built up on the base plate holding the pulleys. The ionic air knife releases air through a long slit which provides a curtain of air which passes over a line of ion emitters which are charged by a power supply for the knife. As static builds, the dust and particulate are attracted to the base plate similar to a magnet. The blast of ionic air reverses this charge and dust is freely removed to the vacuum plenum. The static electricity, in general, is also reduced in the SCAN and FEED areas where these knives are located which reduces the potential for data loss in the equipment's computer.

Figure 9:
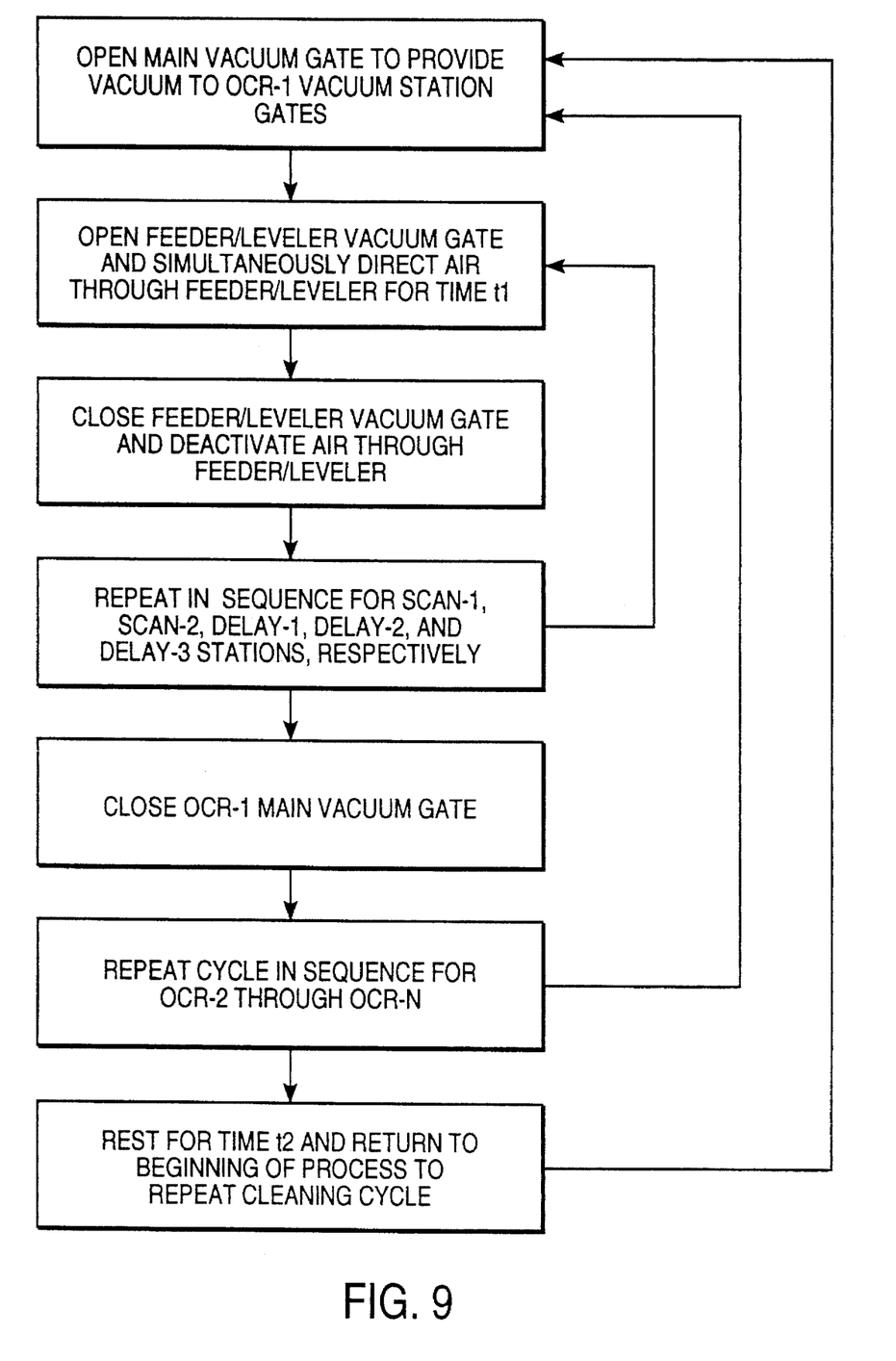
FIG. 9 is a flow chart illustrating an exemplary method for cleaning an OCR according to the present invention.

Referring to FIG. 9, an exemplary method for cleaning an OCR is described. According to the method, a main vacuum gate that is connected to the vacuum source is opened to provide a vacuum to the vacuum station gates of the first OCR to be cleaned. The feeder/leveler vacuum gate is first opened while simultaneously directing compressed air through the feeder/leveler for a time period, t1. Preferably, the compressed air and vacuum will be activated for a time in the range from about 10 seconds to 20 seconds, more preferably for about 15 seconds. The feeder/leveler vacuum gate is then closed and air is deactivated through the feeder/leveler. The vacuum gate for the SCAN-1 station is then opened while simultaneously directing air through SCAN-1 station for the time t1. Alternatively, the air and vacuum can be activated for a time different than t1 as required. The SCAN-1 gate is then closed and the air is deactivated through the SCAN-1 station. This same sequence is then followed in succession for the SCAN-2, the DELAY-i, the DELAY-2, and the DELAY-3 stations, respectively. Alternatively, the order in which the stations are cleaned can be varied as required. Once all of the stations have been cleaned, the main vacuum gate for the first OCR is closed, and the main vacuum gate for the second OCR (or another mail processing device) is opened. The second OCR is then cleaned using the same cycle as previously described for the first OCR. Alternatively, the second OCR can be cleaned using a different sequence than in the first OCR depending upon the particular application and the particular accumulation of particulate in the second machine. After the second OCR is completed, the main vacuum gate for the second OCR is closed, and another OCR or similar device is cleaned as previously described. After all of the OCRs are cleaned, a rest period is started. The rest period will occur for about 10 minutes to 15 minutes, more preferably for about 12 minutes. During the rest period, the vacuum will preferably remain operational and will be stationed at the feeder/leveler station of one of the OCRs until the next cleaning cycle is sequenced. The vacuum stationing during the rest period is preferably alternated to another OCR after each cleaning. After the rest period, the cleaning cycle is again initiated so that each of the OCRs can be cleaned. This process continues automatically until stopped by the controller.

The stationing of the vacuum at the feeder/leveler station during the rest period is preferable because the feeder/leveler station usually receives the most particulate. Hence, while the cycle is in the rest period, the vacuum can be used to further clean the feeder/leveler station. As previously described, the OCR can send a signal to the controller to indicate a no mail situation. This signal indicates that there is no mail available at the feed section during the rest period. Since no mail is present, the controller can send a signal to activate a cleaning cycle for that OCR during the rest period. This provides additional cleaning between cleaning cycles.

The present invention has been described in detail. However, modifications and variations may occur to those skilled in the art without departing from the principles of the claimed invention. Therefore, the scope of the invention should be determined primarily with reference to the appended claims, along with the full scope of equivalence to which those claims are entitled by law.

What is claimed is:

1. A cleaning system for mail processing equipment having a conveyor for transporting mail, the system comprising:

air supply means for directing a supply of air at locations along the length of the conveyor where particulate from the mail tends to accumulate;

vacuum means at locations along the length of the conveyor and spaced apart from the air supply means for creating a vacuum near the air supply means and for collecting and removing the accumulated mail particulate from the equipment;

a controller for actuating the vacuum means during operation of the air supply means;

wherein the air supply means includes a plurality of spaced apart air nozzles near the conveyor for directing a plurality of air streams toward the accumulated particulate, wherein the vacuum means includes a vacuum plenum having a plurality of spaced apart vacuum ports near the conveyor for collecting the accumulated particulate, wherein the mail processing equipment includes a plurality of processing stations, wherein at least one air nozzle and at least one vacuum port are disposed at each station, and wherein the nozzles are spaced apart from the vacuum ports; and a sequencer in communication with the controller for sequentially actuating the air nozzle(s) and the vacuum port(s) of each station, wherein accumulated particulate is sequentially removed along the length of the conveyor.

2. The system of claim 1, wherein a plurality of air lines are disposed between the sequencer and the nozzle(s) of each station, with a separate air line being provided for each station.

3. The system of claim 2, wherein a plurality of vacuum lines are disposed between the vacuum and the vacuum port(s) of each station, a separate vacuum line being provided for each station.

4. The system of claim 3, wherein the sequencer is a pneumatic sequencer and includes a plurality of control valves, the control valves allowing air to be sequentially delivered to each of the air lines.

5. The system of claim 4, wherein an air gate is disposed in each of the vacuum lines, and wherein each of the air gates is in communication with an air line, and wherein delivery of air to the air line actuates the air gate in the vacuum line to both provide air to one of the stations and to create a vacuum at one of the stations.

6. The system of claim 5, wherein each air gate is in communication with an air line that is disposed at the same station at which the vacuum line having the air gate is also disposed.

7. The system of claim 1, wherein each station includes a separate plenum.

8. The system of claim 1, further comprising a plurality of sequencers, each sequencer in communication with the controller and having a plurality of air lines disposed along a plurality of mail processing devices, wherein the controller provides a signal to sequentially activate each sequencer.

9. A cleaning system for a mail optical character reader having a conveyor disposed along a plurality of processing stations, the system comprising:

- at least one air nozzle disposed at each station and at a location along the conveyor where particulate from the mail tends to accumulate;
- at least one vacuum port disposed at each station and spaced apart from the air nozzle for collecting the accumulated particulate at the location;
- a vacuum plenum for creating a vacuum at each vacuum port;
- an air source for directing air through the air nozzle;
- a sequencer for sequentially directing air to selectively pass through the air nozzle at each station and simultaneously drawing a vacuum at the same station, whereby the accumulated particulate is sequentially removed from the locations having the accumulated particulate; and
- a controller in communication with the sequencer for providing sequencing information to the sequencer.

10. A method for cleaning particulate from mail processing equipment, the mail processing equipment including a conveyor for transporting mail, the method comprising the steps of:

- blowing a stream of air over an area of the equipment near the conveyor where the particulate tends to accumulate to blow at least some of the particulate from the area;
- creating a vacuum near and generally opposing the air stream to collect particulate near the air stream and to remove the accumulated particulate from the equipment;
- repeating the blowing and vacuuming steps at other areas along the conveyor where particulate tends to accumulate to remove the accumulated particulate from the other areas of the equipment; and
- wherein the mail processing equipment further includes a plurality of processing stations, wherein the stream of air is blown at the same station at which the vacuum is created, and wherein the blowing and vacuuming steps are repeated by blowing and vacuuming sequentially along the stations.

11. The method of claim 10, further comprising providing a plurality of nozzles connected to an air source to blow the air stream over the area.

12. The method of claim 11, further comprising providing a plurality of vacuum ports connected to a vacuum source to collect the particulate, the vacuum ports being disposed near the conveyor and spaced apart from the air lines.

13. The method of claim 12, wherein the mail processing equipment further includes a plurality of processing stations, and wherein at least one nozzle and at least one vacuum port are disposed at each station, and wherein the blowing and vacuuming steps are repeated by sequentially actuating the nozzle and the vacuum port at each station to remove the particulate from each of the stations.

14. The method of claim 10, wherein the stream of air is blown while simultaneously creating the vacuum.

15. A cleaning system for mail processing equipment having a conveyor for transporting mail, the system comprising:

- air supply means for directing a supply of air at locations along the length of the conveyor where particulate from the mail tends to accumulate;
- vacuum means at locations along the length of the conveyor and spaced apart from the air supply means for creating a vacuum near the air supply means and for collecting and removing the accumulated mail particulate from the equipment;
- a controller for actuating the vacuum means during operation of the air supply means;
- wherein the air supply means includes a plurality of spaced apart air nozzles near the conveyor for directing a plurality of air streams toward the accumulated particulate, wherein the vacuum means includes a vacuum plenum having a plurality of spaced apart vacuum ports near the conveyor for collecting the accumulated particulate, wherein the mail processing equipment includes a plurality of processing stations, wherein at least one air nozzle and at least one vacuum port are disposed at each station, and wherein the nozzles are spaced apart from the vacuum ports; and
- a plurality of sequencers, each sequencer in communication with the controller and having a plurality of air lines disposed along a plurality of mail processing devices, wherein the controller provides a signal to sequentially activate each sequencer.

* * * * *